United States Patent
Maniyar

(10) Patent No.: US 10,990,437 B2
(45) Date of Patent: Apr. 27, 2021

(54) INTERFACE DATA DISPLAY OPTIMIZATION DURING DEVICE OPERATION

(71) Applicant: PAYPAL, INC., San Jose, CA (US)

(72) Inventor: Vidit Nayankumar Maniyar, San Jose, CA (US)

(73) Assignee: PAYPAL, INC., San Jose, CA (US)

( * ) Notice: Subject to any disclaimer, the term of this patent is extended or adjusted under 35 U.S.C. 154(b) by 0 days.

(21) Appl. No.: 16/218,226

(22) Filed: Dec. 12, 2018

(65) Prior Publication Data

US 2020/0192700 A1 Jun. 18, 2020

(51) Int. Cl.
| | | |
|---|---|---|
| *G06F 9/48* | (2006.01) | |
| *H04M 1/725* | (2021.01) | |
| *G01C 21/36* | (2006.01) | |
| *G06F 9/451* | (2018.01) | |
| *G06F 9/54* | (2006.01) | |

(52) U.S. Cl.
CPC ....... *G06F 9/4837* (2013.01); *G01C 21/3664* (2013.01); *G06F 9/451* (2018.02); *G06F 9/542* (2013.01); *H04M 1/72572* (2013.01); *H04M 1/72577* (2013.01)

(58) Field of Classification Search
CPC ........ G06F 9/4837; G06F 9/451; G06F 9/542; G01C 21/3664; H04M 1/72572; H04M 1/72577
See application file for complete search history.

(56) References Cited

U.S. PATENT DOCUMENTS

| | | | | |
|---|---|---|---|---|
| 6,337,694 | B1* | 1/2002 | Becker | G06F 3/04855 345/684 |
| 8,438,496 | B1* | 5/2013 | Hegde | G06F 3/0485 715/784 |
| 2003/0098882 | A1* | 5/2003 | Cowden | G06F 16/95 715/781 |
| 2004/0098462 | A1* | 5/2004 | Horvitz | G05B 19/404 709/207 |
| 2006/0037038 | A1* | 2/2006 | Buck | G06F 3/013 725/9 |
| 2008/0120229 | A1* | 5/2008 | Patil | G06Q 20/10 705/39 |
| 2009/0177965 | A1* | 7/2009 | Peralta | G06F 9/451 715/716 |

(Continued)

*Primary Examiner* — Mandrita Brahmachari
(74) *Attorney, Agent, or Firm* — Haynes and Boone, LLP

(57) ABSTRACT

There is provided systems and methods for interface data display optimization during critical device operations. A user may utilize a device to perform various device or application functionalities, which may include critical computing tasks at times. These critical processes may include certain GUI data display that the user and/or device requires to be displayed during the critical processes. To prevent the GUI data display from being obscured by other banners, pop-up notifications, or other interface data displays, the device may determine whether the current displayed interface data on the GUI is critical or has a higher priority for display than a new request for data display. This may be based on preferences within the application, where the requested data display may occur on the GUI, current device or application data, and/or information for the requested data display. The device may then block the data display.

20 Claims, 5 Drawing Sheets

(56) References Cited

U.S. PATENT DOCUMENTS

| | | | |
|---|---|---|---|
| 2010/0049890 A1* | 2/2010 | Best | G06Q 10/10 |
| | | | 710/73 |
| 2011/0283226 A1* | 11/2011 | Basson | G06F 9/453 |
| | | | 715/794 |
| 2013/0139104 A1* | 5/2013 | Singh | G06F 3/0481 |
| | | | 715/798 |
| 2014/0019873 A1* | 1/2014 | Gupta | H04L 67/36 |
| | | | 715/744 |
| 2014/0256303 A1* | 9/2014 | Jones | H04W 4/027 |
| | | | 455/418 |
| 2015/0348513 A1* | 12/2015 | Grimme | G06F 3/013 |
| | | | 345/637 |
| 2017/0289181 A1* | 10/2017 | Wang | H04L 63/1416 |

* cited by examiner

INTERFACE DATA DISPLAY OPTIMIZATION DURING DEVICE OPERATION

TECHNICAL FIELD

The present application generally relates to computing device data displays, and more specifically to determining what data to display and what data to suppress based on current processes being conducted on the computing device.

BACKGROUND

Users may utilize computing devices, such as mobile smart phones, that display operating system and application interfaces/data to users through a graphical user interface (GUI). The GUI allows users to view and interact with the particular processes and functionalities of the device's operating system and application. During use of an application, a particular process may display data that is necessary to be displayed and/or viewed by a user. For example, a mobile device may include a mapping application that displays directions to a user while the user is traveling, and therefore provide time and/or location sensitive data that is required to be viewed by the user.

With modern computing devices, many applications and processes may be executing at the same time. Therefore, when critical or high priority data is being displayed and is required by a user, another application interface, notification, or other GUI output may obscure the critical interface data from being viewed. For example, a message may be incoming while time or location sensitive data (e.g., step-by-step turn directions) is being displayed in an interface of the mapping application. Thus, presentation of a pop-up notification may obscure the time or location sensitive data display or otherwise disrupt viewing of the more important content. This may adversely affect the user utilizing the device and may lead to sub-optimal device usage and interface data displays. Additionally, this may cause unnecessary data processing and interface displays, which require additional user input to resolve and results in wasted computing resources and less than optimal use of limited size displays.

Figure 1:
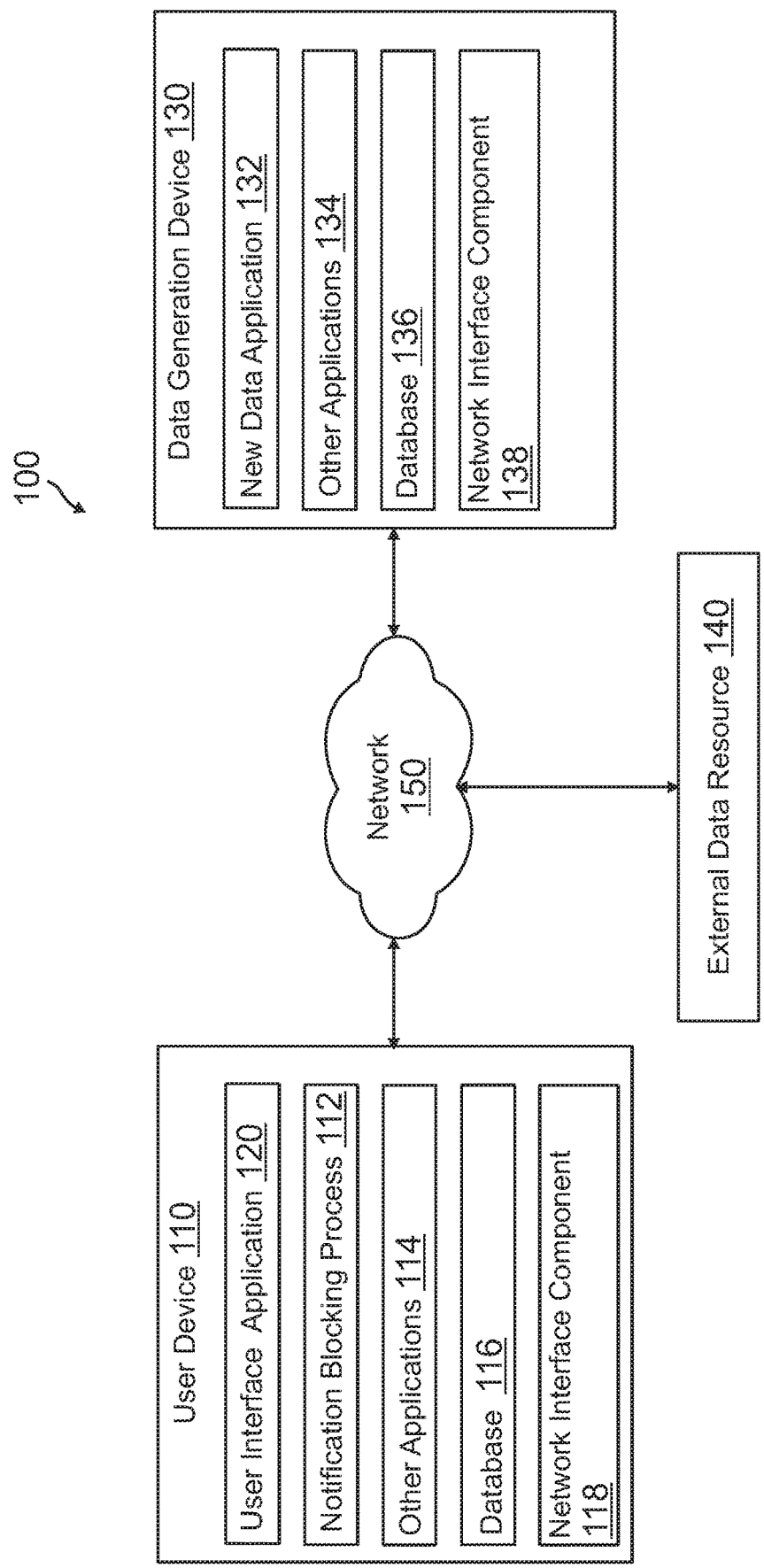
FIG. 1 is a block diagram of a networked system suitable for implementing the processes described herein, according to an embodiment.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

Provided are methods utilized for interface data display optimization during various device operations. Systems suitable for practicing methods of the present disclosure are also provided.

During use of a computing device, such as a mobile communication device, desktop, laptop, or tablet computer, or other type of device, operating systems and/or specific device applications may display data through a graphical user interface (GUI) of the device. A GUI provides a type of device interface that allows users to interact with content displayed on a device and its various applications and processes through visual displays, which may include text as well as graphical representations (e.g., images, icons, and other visual displays of data). When a user utilizes the device, the device may output data through the GUI in response to certain user requests and inputs. Thus, application interfaces and processes may request the device to output data through the GUI to allow a user to view data and interact with the device and the device's applications. Typical devices may execute multiple applications in parallel, and each application may independently wish to display or output data to a user in an interface at the same time. In some embodiments, a specific or single application may also be concurrently executing multiple processes, where each process may wish to display data to a user at the same time or overlapping times.

However, one process that populates data in an interface or interface element may cause overlapping, obscuring, covering, or hiding other interface data on the GUI from being displayed, which may cause improper or poor device usage and friction with user interactions. This may also cause unnecessary interface data processing and additional user input to navigate to important interface data, which slows device performance and causes unnecessary data processing. To address this problem, a device may automatically determine interface data output that optimizes device performance and interface displays on a GUI through determination of critical, prioritized, or preferred application data that takes priority for display over other application data that attempts to populate on the GUI through an application interface, element, notification, etc. This may include data that a user requires for viewing and/or processing based on specific device operating conditions and other available information. The device may then block the non-priority or lower priority data from overlapping or covering the higher priority data and preventing the user from viewing and/or interacting with the higher priority data or content. In some embodiments, other types of device interfaces, including text-based interfaces that provide command-line type interface displays may also be optimized for data display during different device and application processes, as discussed herein.

In order to determine whether a particular application is outputting critical or higher priority data, the device may analyze the presently displayed data to determine whether the data is critical or otherwise viewed as important to the user for display. The device may also determine data to be displayed within a certain timeframe (e.g., within the next few microsecond, seconds, minutes, etc.). The device may limit the time frame to determine whether critical data will be covered by presentation of other data on the GUI based on user preferences, how long the other data may be displayed and cover the current critical application data display or based on a general setting by the device. For example, if the current data is non-critical or not important to be viewed, however, critical data will be displayed in a portion of the GUI in the next 10 seconds and a banner notification will cover the critical data on the GUI for the next 30 seconds, the device may determine that the data to be displayed is critical over the banner notification. The device may determine that the application is (or will be based on a current application processes executed by the device) displaying the critical or prioritized data based on one or more of operating system data or requests for the device, a location of the device, a current time, a movement of the device or of an entity associated with the device (e.g., movement detected of a user or vehicle), a current website displayed in the application, a contact transmitting a message, in-application actions by a user when utilizing the device, an application message or data received by the device, application data processed by the device (e.g., content in the application), and/or current output data in an interface.

The application data may also be determined to be preferred to be displayed over other data based on past user requests for interface data display. For example, when using an application and/or viewing certain data within the application, past user input and requests may hide other data that attempts to or does populate on the GUI. The device may determine whether the user has preferences to display particular data over other data based on the past input, which may occur one or more times when viewing the application/ application data. For example, a user may open a certain notification or message while at home but ignore the same type of notification while driving. In another example, a user may always dismiss or ignore all notifications while making a purchase on a live auction site or application but view all notifications while the user is reading emails. In yet another example, a user may always view and open texts from a family member, but not from certain contacts or from unknown senders, regardless of the current content or data being displayed. Thus, how a specific user responds to notifications based on location, context, time, and any other factor can be used by the system to better determine whether incoming data should be displayed or hidden for the particular user.

In some embodiments, the critical data that is prioritized for display on the GUI may correspond to navigation data displayed by a mapping, travel, or routing application on the device. For example, a user may request a travel route in the application, which may provide step-by-step directions that are required to be viewed by the user. The critical navigation data may also be based on a point that the user/device is at on the route. In such embodiments, if the user is to remain on the same road/route and does not have a change in directions or transition on the route upcoming for an amount of time or distance, the navigation data may be non-critical. However, as the user/device approaches the transition, the navigation data and display on the GUI may become critical for display.

The critical data may also correspond to checkout and/or transaction processing data in an electronic transaction processing and/or mobile payment application. The checkout data may be non-critical while the user is shopping in the application. However, as the user initiates a checkout process for items in a digital shopping cart or other checkout process, the data may become critical for display so that the user may properly enter authentication credentials, payment/ financial information, and/or personal/billing/shipping information. For example, as the user is browsing items for sale, the data may be non-critical and banner messages may be free to populate as the user is merely browsing shopping items and information. However, after the user adds one or more items to a digital shopping cart, the user may click on the cart or a process to view and checkout for the cart, which requires input of sensitive information (e.g., authentication information, personal/financial information, etc.). In some embodiments, checkout of the cart may be time based, such as purchases of limited items (e.g., event tickets, sale items, etc.). Thus, this data may become critical due to the sensitive nature and/or time constraints.

In this regard, an authentication field for authentication credential entry for other types of applications, websites, and/or services may also be considered as critical to ensure proper entry of credentials and/or complete checkout in a timed environment. Critical data may also correspond to messaging data from certain messaging contacts and/or having certain messaging content or may include in-application actions in a messaging application (e.g., to prevent the application from scrolling through currently displayed messaging data to a newly received message). Other types of displayed data that may be considered to be critical for display and thus prioritized over display of other data may include playback of video or other media, video game data displays, financial data displays (e.g., taxes, banking, etc.), word processing or other data input (e.g., spreadsheet data display/processing, media presentation generation, etc.), camera displays associated with image or video capture, interface displays associated with posting or sharing data on a platform, or other interface data displays that may require current user focus, attention, and/or input. In another example, critical or non-critical data may be determined based on a time frame the user may need to respond or take an action on the data, such as making a purchase or selecting an item for purchase within a shortened time frame as opposed to a purchase or selection where the user has a much longer window to take action.

In contrast to critical or prioritized data, non-critical or non-prioritized data that the device blocks from viewing may be based on similar application data and interface output. The non-critical data may also be determined based on user preferences and/or past user actions to hide non-critical data when viewing certain critical data in an application. For example, the user may continuously hide, close, or dismiss message banners to view certain application data on a GUI. Thus, the device may learn which data is preferred to be hidden and is non-critical to the user at different times and under different situations. In other embodiments, the data that is being requested to be displayed may be parsed or other processing techniques may be used to determine content of the data to be displayed and whether the data is critical or prioritized for display. The user may also set preferences, device conditions or detected data, and/or authorizations with application data and may further designate the type of data to be blocked from display on the GUI. For example, the user may establish that during a checkout transaction on a website, the browser application may consider all other data requested to be displayed on the GUI is non-critical and therefore blocked or may establish that only certain data is blocked (e.g., blocking message pop-ups but displaying operating system error messages). Some types of non-critical data may include social networking posts, messages, or alerts, messages based on message content or transmitting contact, or more generally may be based on a type of banner message or alert.

In some embodiments, the device may determine the data for display and which incoming notifications or data display requests are blocked on the device based on level of importance or priority. Displayed data on a GUI may be ranked or assigned a level of prioritization, which may affect whether other data may cover or overlap that data based on the level of prioritization of the new data for display. Thus, the device may institute a ranking system for optimization of when new data display requests may cover or overlap other displayed data and may only display that data if the new data outranks the currently displayed interface data. For example, a navigation application displaying directions may be assigned a value of 7, while a normal message assigned a value of 3 is blocked. However, if the message is marked urgent and assigned a value of 10, the message may be displayed over the directions in a notification. The ranking may change over time, for example, as the directions indicate an upcoming transition or based on the time until the next transition (e.g., three minutes away). The ranking may also change based on the phase within an application process, for example, a low priority if the user is merely entering item information in a checkout process, but a high priority for authentication and/or payment information entry.

Based on the prioritization of data for display, the device may then choose to block certain data for display by preventing a pop-up or push notification, banner, or other application interface or interface element from being displayed on the GUI when the critical data is displayed. This may be portion-specific for the part of the GUI that displays the critical data, and thus the new data display request may be presented on another portion of the GUI. However, this may entirely block the new data display request from being presented anywhere on the GUI to prevent covering of currently displayed data. The device may determine how long to block the data, which may correspond to a length of time to complete, view, or utilize the prioritized data display (e.g., complete a transaction checkout or a transition on a travel route), or may generally correspond to a length of time for the user to view and interact with the prioritized data on the GUI (e.g., based on a user preference, past user interactions, etc.). The device may also provide a process for the user to request that the blocked data be displayed, for example, through a button or icon that informs the user that a data display request has been blocked but does not cover the prioritized data on the GUI. Thus, the device may determine when and how long to block data from display on the GUI and may determine how and when to reveal the data on the GUI after blocking.

After expiration of the priority data display (e.g., the data is no longer a priority, such as the directions are no longer critical or the checkout process is complete) or expiration of the time limit for blocking the non-priority data display, the device may then populate and display the blocked data on the GUI as it would normally in a banner notification, interface element, etc. The device may display the data based on previous display parameters, such as on a portion of the GUI that the blocked data would normally be displayed and for a length of normal display time. However, the device may also display the blocked data until newly prioritized data is requested to be displayed, and then if the new data display request is more highly prioritized than the currently displayed data, may display the new data and/or hide/block the previous data, as discussed herein. Thus, the device may determine what kind of interface data is displayed and hidden and how to display the interface data based on the prioritization of the data display request. In such embodiments, only partial data for the blocked data may be displayed in an interface.

Note that the terms used herein to describe data that is displayed and data that is suppressed or not displayed maybe relative. For example, navigation data, even though indicating an upcoming transition, may be considered non-critical if incoming data is determined to have a higher priority, such as a notification the user had requested when an item is available for purchase (e.g., event tickets having a very short response time) or a text from child that indicates a situation requiring immediate attention (e.g., being in an accident). In another example, navigation data may not be considered critical if the navigation is for a route or to a destination the user travels frequently. Thus, a determination of whether to suppress or hide data essentially is based on whether the incoming data has a higher priority to the user for display than data currently being displayed, which may vary from user to user, from situation to situation, and from content to content.

As such, a device may utilize a process to optimize interface data display to better populate interface data and prevent other data display requests from hiding or obscuring particular data within a GUI. This allows the device to reduce user friction when displaying data in a GUI and further reduces required input and data processing when a user requests certain data to be displayed. Moreover, the device may determine when to display blocked data without requiring a user to actively request that the data be displayed, thereby reducing the required interaction a user has with a device. This helps solve problems inherent in data display on a GUI when multiple applications on a device are executing and attempting to output data.

FIG. 1 is a block diagram of a networked system 100 suitable for implementing the processes described herein, according to an embodiment. As shown, system 100 may comprise or implement a plurality of devices, servers, and/or software components that operate to perform various methodologies in accordance with the described embodiments. Exemplary devices and servers may include device, stand-alone, and enterprise-class servers, operating an OS such as a MICROSOFT® OS, a UNIX® OS, a LINUX® OS, or other suitable device and/or server based OS. It can be appreciated that the devices and/or servers illustrated in FIG. 1 may be deployed in other ways and that the operations performed and/or the services provided by such devices and/or servers may be combined or separated for a given embodiment and may be performed by a greater number or fewer number of devices and/or servers. One or more devices and/or servers may be operated and/or maintained by the same or different entities.

System 100 includes a user device 110, a data generation device 130, and an external data resource 140, in communication over a network 150. A user (not shown) may utilize user device 110 to view, process, and interact with data an input through one or more device operating systems and applications. During the course of using user device 110, certain data may be displayed on a GUI of the device, where the user may require the data to be displayed and/or the data may be prioritized for display. The data may be displayed based on internal data processing and/or through data received from external data resource 140. Another data display request may be received from an internal process of user device 110 and/or from an external source over network 150, such as data generation device 130. User device 110 may determine whether the new data display request will cover, obscure, or otherwise interfere with the currently displayed data on the GUI, and whether the new data request is prioritized over the currently displayed data. If the currently displayed data is prioritized over the new data display request and would be at least partial covered, the new data display request may be blocked by user device 110.

User device 110, data generation device 130, and external data resource 140 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 100, and/or accessible over network 150.

User device 110 may be implemented as a communication device that may utilize appropriate hardware and software configured for wired and/or wireless communication with data generation device 130 and/or external data resource 140. For example, in one embodiment, user device 110 may be implemented as a personal computer (PC), a smart phone, laptop/tablet computer, wristwatch with appropriate computer hardware resources, eyeglasses with appropriate computer hardware (e.g. GOOGLE GLASS®, other type of wearable computing device, implantable communication devices, and/or other types of computing devices capable of transmitting and/or receiving data, such as an IPAD® from APPLE®. Although only one communication device is shown, a plurality of communication devices may be used and function similarly.

User device 110 of FIG. 1 contains a user interface application 120, a notification blocking process 112, other applications 114, a database 116, and a communication module 118. User interface application 120 and other applications 114 may correspond to executable processes, procedures, and/or applications with associated hardware. In other embodiments, user device 110 may include additional or different modules having specialized hardware and/or software as required.

User interface application 120 may correspond to one or more processes to execute software modules and associated components of user device 110 to provide data and process output and interactable through one or more user interfaces, which may be customized to change, hide, or block certain data display requests based on prioritization of data output on a GUI. In this regard, user interface application 120 may correspond to specialized hardware and/or software of user device 110 to output data through a user interface and allow users to view and/or utilize the data, for example, through one or more application processes. In certain embodiments, user interface application 120 may be used to initiate and/or generate transactions to purchase items, as well as request transaction processing through external data resource 140. User interface application 120 may be utilized by a user to view items for purchase from a merchant, including online merchant platforms or physical merchant locations, and select one or more items to purchase in a transaction. Once a transaction is generated, user interface application 120 may be used to request checkout and transaction processing for the transaction. In various embodiments, the merchant may provide checkout and payment processing using services provided by external data resource 140. Where the user has an account with external data resource 140 and/or uses a payment instrument that external data resource 140 processes with an online financial entity, such as a bank for a debit/credit card, user interface application 120 may utilize such account.

User interface application 120 may also correspond to other types of applications having various functionalities, such as navigation or travel routing, messaging, banking, social networking, media playback, video games, content access, word processing or other data entry, camera or media capture, or other application functionalities, including applications discussed in reference to other applications 114 of user device 110. For example, user interface application 120 may provide navigation and directions, which may be displayed with a map and/or text/voice commands. User interface application 120 may display messages from one or more users, which may be interacted with to scroll through the messages and/or respond to users. User interface application 120 may include contacts and a contact list.

User interface application 120 may provide one or more authentication mechanisms, which may allow a use to authenticate themselves and/or provide data processing (e.g., through electronic transaction processing). The authentication mechanism may be used to unlock user device 110 and display a home page or operating system interface, open user interface application 120, authenticate the user for use of user interface application 120, or login to an account with user interface application 120, and/or execute a process or view data within user interface application 120. Thus, user interface application 120 may correspond to an operating system application that provides processes used with user device 110 to secure user device 110 and login to an account to use applications and processes of user device 110. In various embodiments, user interface application 120 may correspond to a general browser application configured to retrieve, present, and communicate information over the Internet (e.g., utilize resources on the World Wide Web) or a private network. For example, user interface application 120 may provide a web browser, which may send and receive information over network 150, including retrieving website information, presenting the website information to the user, and/or communicating information to the website, including electronic communications and associated information. However, in other embodiments, user interface application 120 may include a dedicated application associated with data generation device 130, external data resource 140, or other entity, which may be configured to send and receive data and display the data in a GUI of user device 110.

User interface application 120 may be used to output data, which may include critical or prioritized data that should be displayed over other non-critical or lower priority data. Thus, an interface may be displayed during use of user interface application 120, for example, during electronic transaction processing and completing the checkout process, navigation, and/or messaging. In order to provide data processing, display data, and/or otherwise use user device 110 so that critical data is not hidden or obscured by other data during use of user interface application 120, notification blocking process 112 may first determine whether the critical data may be at least partially hidden by a new data display request, and that the critical data has a higher priority for display over the new data display request. User interface application 120 may also include preferences for what data is critical or prioritized for display, as well as what other data should be blocked when displaying the critical data (as well as for how long and when to display the blocked data).

Notification blocking process 112 may correspond to one or more processes of user device 110 to determine whether new data requested to be displayed on a GUI of user device 110 would cover critical or prioritized application data currently displayed on the GUI, and, if so, block the new data from being displayed. In this regard, notification blocking process 112 may correspond to specialized hardware and/or software utilized by user device 110 for first receive a request to display data on a GUI of user device 110 and determine the currently displayed data on the GUI. For example, one or more of user interface application 120 or other applications 114 may receive and/or process data, where the data is to be displayed on the GUI. Notification blocking process 112 may then determine what data is currently displayed on the GUI, for example, in one or more operating system or application interfaces and/or interface elements (e.g., fields, portions of the GUI, etc.). Once the currently displayed data is determined, notification blocking process 112 may then determine whether the currently displayed data is critical for application functionality, user viewing, and/or output on the GUI. This may correspond to determining an importance or priority of data display, as well as any user preferences for the data to be displayed. This may be based on the data being displayed on the GUI, such as the content, where the data originates, the application requesting the data to be output, etc. This may also correspond to a time, location of user device 110, movement of user device 110, or other parameter of usage of user device 110. The priority level determination may correspond to all data being displayed on the GUI at once, such as how important the current total GUI output is or may correspond to individual portions of data being displayed on the GUI.

Notification blocking process 112 may then determine the priority to display the newly received and/or processed data on the GUI, and whether the data has a higher priority for display than the currently displayed data. Notification blocking process 112 may utilize similar information and metadata for the new data to determine whether the new data has a higher priority for display then the data currently displayed on the GUI. The priority level or score for both the currently displayed data and the new data may be compared to determine whether to display the new data and cover, hide, or otherwise obscure the new data, or whether the new data will be blocked from display by notification blocking process 112. The comparison and determination of whether to block the data may also be based on where the new data is to be displayed on the GUI and the particular data that the new data will obscure if displayed. If the new data is blocked from display by notification blocking process 112, notification blocking process 112 may further determine when to display the blocked data or may alert the user of the blocked data so that the user may navigate to the blocked data in another application or application process for viewing. If notification blocking process 112 automatically releases the blocked data from being blocked so that the portion or interface element on the GUI may display the data (and thereby obscure or hide other data), notification blocking process 112 may release the blocked data based on user preferences, if the prioritized data no longer is prioritized, if the new data becomes critical for display based on device factors and/or new data content, or other parameter. Thus, notification blocking process 112 may interface with an application programming interface (API) of user interface application 120 to cause changes to interface output display within user interface application 120 based on the determination of what data to display and blocking of data during display of critical/prioritized data.

In certain embodiments, one or more of the processes of user interface application 120 and notification blocking process 112 may be provided within the same application to provide their respective processes discussed above within a single application.

In various embodiments, user device 110 includes other applications 114 as may be desired in particular embodiments to provide features to user device 110. For example, other applications 114 may include security applications for implementing client-side security features, programmatic client applications for interfacing with appropriate application programming interfaces (APIs) over network 150, or other types of applications. Other applications 114 may also include additional communication applications, such as email, texting, voice, and IM applications that allow a user to send and receive emails, calls, texts, and other notifications through network 150, which may populate as pop-up notifications, banners, or other interface elements that cover other interface data being displayed. In various embodiments, other applications 114 may include financial applications, such as banking, online payments, money transfer, or other applications, which may be utilized to maintain a user account with external data resource 140 and may display prioritized data or populate other non-prioritized data that may be blocked. Other applications 114 may also include other location detection applications, such as a mapping, compass, and/or GPS application, which may be used to determine a location for user device 110 and may display directions based on a location of user device 110. Other applications may include social networking applications and/or media playback applications. Other applications 114 may include device interfaces and other display modules that may receive input and/or output information. For example, other applications 114 may contain software programs, executable by a processor, including a graphical user interface (GUI) configured to provide an interface to the user. Thus, other applications 114 may include one or more applications that may be in communication with notification blocking process 112 through one or more APIs to adjust, change, or hide interface data during interface display and output.

User device 110 may further include database 116 stored in a transitory and/or non-transitory memory of user device 110, which may store various applications and data and be utilized during execution of various modules of user device 110. Database 116 may include, for example, IDs such as operating system registry entries, cookies associated with user interface application 120 and/or other applications 114, IDs associated with hardware of user device 110, or other appropriate IDs, such as IDs used for payment/user/device authentication or identification. Database 116 may store information for authentication of an account, such as identifiers, tokens, cookies, and/or authentication provided to user device 110 from external data resource 140. Additionally, preferences for data display and other factors used to determine prioritization of data display on a GUI may be stored to database 116.

User device 110 includes at least one communication module 118 adapted to communicate with data generation device 130 and/or external data resource 140. In various embodiments, communication module 118 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices.

Data generation device 130 may be implemented as a communication device that may utilize appropriate hardware and software configured for wired and/or wireless communication with user device 110 and/or external data resource 140. For example, in one embodiment, data generation device 130 may be implemented as a personal computer (PC), a smart phone, a laptop/tablet computer, a wristwatch with appropriate computer hardware resources, eyeglasses with appropriate computer hardware (e.g. GOOGLE GLASS™, other type of wearable computing device, implantable communication devices, and/or other types of computing devices capable of transmitting and/or receiving data, such as a FITBIT™. However, in other embodiments, data generation device may correspond to a server or other online resource that is maintained, for example, by an online service provider, which may include payment processing providers and other type of financial service providers. In this regard, data generation device 130 may transmit data to user device 110, where the data is requested to be processed and populated on a GUI of user device 110.

Data generation device 130 may correspond to a device or component associated with user device 110, which may utilize appropriate hardware and software configured for wired and/or wireless communication with at least one of user device 110. For example, data generation device 130 may be communicatively coupled to user device 110 through short range wireless communications. Data generation device 130 may include short range wireless communication components, which may utilize short range wireless communications to communicate with user device 110 (e.g., over Bluetooth Low Energy, LTE Direct, WiFi, radio frequency, infrared, Bluetooth, near field communications, etc.). In other embodiments, data generation device 130 may further include network communication components and be capable of transmitting and/or receiving information with user device 110.

Data generation device 130 of FIG. 1 includes a new data application 132, other applications 134, a database 136, and a network interface component 138. New data application 132 and other applications 134 may correspond to executable processes, procedures, and/or applications with associated hardware. In other embodiments, data generation device 130 may include additional or different modules having specialized hardware and/or software as required.

New data application 132 may correspond to one or more processes to execute modules and associated specialized hardware of external data resource 140 to provide a service to user device 110, which may be accessed through one or more applications of user device 110 and provide data and/or executable processes to interact with the service through application interfaces displayable by user device 110. In this regard, new data application 132 may correspond to specialized hardware and/or software to receive a communication request from user device 110 and respond to the communication request, for example, by serving data to user device 110 displayable through application interfaces. Depending on the priority level and/or whether the current displayed data by user device 110 on a GUI is more critical than the data provided by new data application 132, data provided by new data application 132 may be altered, changed, or hidden in the interfaces displayed by user device 110. In this regard, user device 110 may hide, change, or affect display of the data directly when received by user device 110. In some embodiments, the new data may be requested by user device 110 during execution of a process. However, new data application 132 may also route, push, or transmit the new data for display on a GUI of user device 110 based on other input to data generation device 130, received by data generation device 130 (e.g., acting as a routing server for message transmission), and/or processed by data generation device 130.

In various embodiments, data generation device 130 includes other applications 134 as may be desired in particular embodiments to provide features to data generation device 130. For example, other applications 134 may include security applications for implementing server-side security features, programmatic client applications for interfacing with appropriate application programming interfaces (APIs) over network 150, or other types of applications. Other applications 134 may contain software programs, executable by a processor, including a graphical user interface (GUI), configured to provide an interface to the user when accessing data generation device 130. In various embodiments where not provided by new data application 132, other applications 134 may include communication or other applications that generate the new data transmitted to user device 110 through new data application 132.

Additionally, data generation device 130 includes database 136. Accounts and other account data may be stored to database 136, which may include entity information, such as name, address, birthdate, payment/funding information, additional user financial information, and/or other desired user data. Additionally, other new data generated and/or received for transmission to user device 110 may be stored to database 136.

In various embodiments, data generation device 130 includes at least one network interface component 138 adapted to communicate user device 110 and/or data generation device 130 over network 150. In various embodiments, network interface component 138 may comprise a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency (RF), and infrared (IR) communication devices.

External data resource 140 may be maintained, for example, by an online service provider, which may provide data to user device 110 for display by user interface application 120. In this regard, external data resource 140 includes one or more processing applications which may be configured to interact with user device 110, data generation device 130, and/or another device/server to facilitate application usage and data display by user device 110. In one example, external data resource 140 may be provided by PAYPAL®, Inc. of San Jose, Calif., USA. However, in other embodiments, external data resource 140 may be maintained by or include another service provider that may provide services and/or data accessible through user device 110, such as through navigation or travel routing applications, messaging applications, media playback applications, video game applications, or other applications that may display priority data during use of user device 110.

Network 150 may be implemented as a single network or a combination of multiple networks. For example, in various embodiments, network 150 may include the Internet or one or more intranets, landline networks, wireless networks, and/or other appropriate types of networks. Thus, network 150 may correspond to small scale communication networks, such as a private or local area network, or a larger scale network, such as a wide area network or the Internet, accessible by the various components of system 100.

Figure 2:
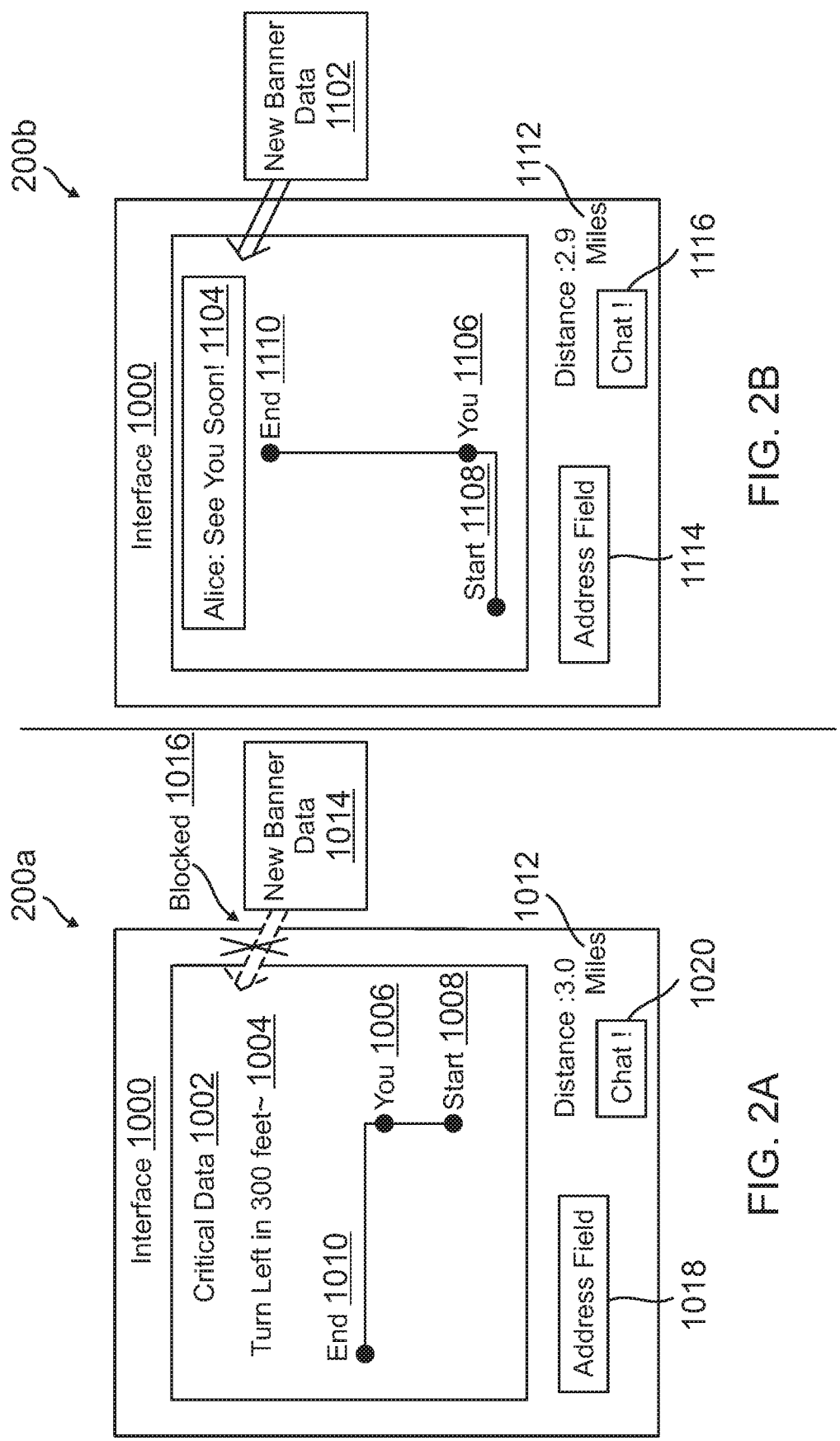
FIG. 2A is an exemplary application interface optimized to block data from covering or obscuring critical application data during a critical process, according to an embodiment, according to an embodiment.
FIG. 2B is an exemplary application interface optimized to display blocked data after resolving a critical process displaying application data, according to an embodiment.

FIG. 2A is an exemplary application interface optimized to block data from covering or obscuring critical application data during a critical process, according to an embodiment, according to an embodiment. Environment 200*a* of FIG. 2A includes an exemplary application interface having prioritized data displayed during use of an application on a user device. In this regard, environment 200*a* displays an application interface 1000 of user device 110 discussed in reference to system 100 of FIG. 1. Interface 1000 displays interface data and accessible processes executable by user device 110 through interface 1000, which includes critical or prioritized data that is displayed while blocking other non-critical data from overlapping, hiding, or covering the critical data.

Interface 1000 includes interface data that may be displayed in response to an application executing a process, for example, on a GUI of user device 110. In this regard, critical data 1002 is displayed by user device 110 on a mapping interface of a navigation application. However, FIG. 2A is exemplary, and other types of applications may also display critical data. Critical data 1002 includes step-by-step direction 1004, "Turn left in 300 feet." Step-by-step direction 1004 is an upcoming transition that is important for a user to view so the user can properly follow directions in interface 1000. Thus, step-by-step direction 1004 is deemed critical and has a high priority for display. For example, a user may include a travel route that shows a map having geolocation 1006 of user device 110 on a route between a start point 1008 and an endpoint 1010. Interface 1000 displays the route along with step-by-step direction 1004 so that the user can navigate on the route and may further display a distance 1012 for travel.

However, during use of user device 110 and while critical data 1002 displays step-by-step direction 1004, newly processed and/or received data may include new banner data 1014 that is displayed in a banner on interface 1000. New banner data 1014 is shown as being transposed over step-by-step direction 1004 if new banner data 1014 is allowed to populate on interface 1000. In order to prevent this, user device 110 may issue a blocking command through an operating system or application process that performs blocked action 1016 to prevent new banner data 1014 from covering step-by-step direction 1004. This may be done due to the urgency, location, and time of display of direction 1004 as direction 1004 has a higher priority to display over new banner data 1014. Thus, new banner data 1014 has a lower priority to display due to the priority of critical data 1002. Interface 1000 is also shown with non-critical or prioritized elements, which may be covered. For example, critical data 1002 only includes step-by-step direction 1004, but does not include distance 1012, an address field 1018 for searching for a destination location (e.g., endpoint 1010), or a chat feature 1020. Thus, if new banner data 1014 was instead populated over these non-critical elements, new banner data 1014 may be displayed and blocked action 1016 may not occur. In some embodiments, user device 110 may move new banner data 1014 to cover these non-critical elements instead if it is desired to display new banner data 1014 during display of step-by-step direction 1004. User device 110 may therefore reposition new banner data 1014 on interface 1000 to cover non-critical elements and populate new banner data 1014 at the same time as critical data 1002. User device 110 may determine locations within interface 1000 to reposition new banner data 1014 based on the priority of display of the data, such as if new banner data 1014 is more critical to display than distance 1012, address field 1018, and/or chat feature 1020.

In some embodiments, user device 110 may also shrink all of interface 1000 to allow new banner data 1014 to be displayed with interface 1000 on a GUI of user device 110. This may occur if new banner data 1014 has a same criticality or priority of viewing as one or more of the data elements within interface 1000. This also may occur if shrinking of interface 1000 still allows proper viewing of critical data 1002 and would not obscure or make too small the information in critical data 1002. Thus, new banner data 1014 may be displayed at a same time as interface 1000 by changing a size or shape of interface 1000. In some embodiments, critical data 1002 may instead be moved within interface 1000 so that new banner data 1014 may be displayed with critical data 1002. For example, critical data 1002 may be moved down or overlaid onto non-critical elements, and new banner data 1014 may be displayed at the place that critical data 1002 was previously displayed.

FIG. 2B is an exemplary application interface optimized to display blocked data after resolving a critical process displaying application data, according to an embodiment. Environment 200*b* of FIG. 2B includes an exemplary application interface having non-prioritized data displayed during use of an application on a user device, and therefore covered by an overlay of other new data. In this regard, environment 200*b* displays an application interface 1100 of user device 110 discussed in reference to system 100 of FIG. 1. Interface 1100 displays interface data and accessible processes executable by user device 110 through interface 1100, which includes non-critical or non-prioritized data that is covered by a new data display request.

Interface 1100 of user device 110 is shown as having particular non-prioritized data obscured or covered by a new data request after the non-prioritized data no longer has a higher data display prioritization based on changes in device parameters and/or content of the data display. For example, interface 1100 displays new banner data 1102 that was blocked in FIG. 2A in message 1104, "Alice: See you soon!" Message 1104 is displayed as a banner notification over the portion of the GUI displaying interface 1100 that previously was blocked from displaying such data in FIG. 2A. As shown in FIG. 2B, the travel route between start point 1108 and end point 1110 has advanced past the previous critical directions for display in FIG. 2A. For example, a distance 1112 shows user device 110 as closer to end point 1110 and past the transition in the navigation application. Thus, the portion of the GUI no longer is displaying critical data, and new banner data 1102 may display message 1104 in the portion of the GUI. Moreover, the user may further interact with other non-critical elements, such as address field 1114 and chat feature 1116 while display of message 1104.

As discussed herein, new banner data 1102 may also be display on or with interface 1100 by repositioning new banner data 1102 with interface 1100 so that new banner data 1102 does not cover any critical data. In some embodiments, critical data may instead be moved so that new banner data 1102 may be displayed in a place where the critical data was previously displayed. Additionally, the size, shape, or placement of interface 1100 on a GUI of user device 110 may also be moved or adjusted so that new banner data 1102 may be displayed, for example, by shrinking a size of interface 1100 on GUI or repositioning interface 1100 on the GUI.

Figure 3:
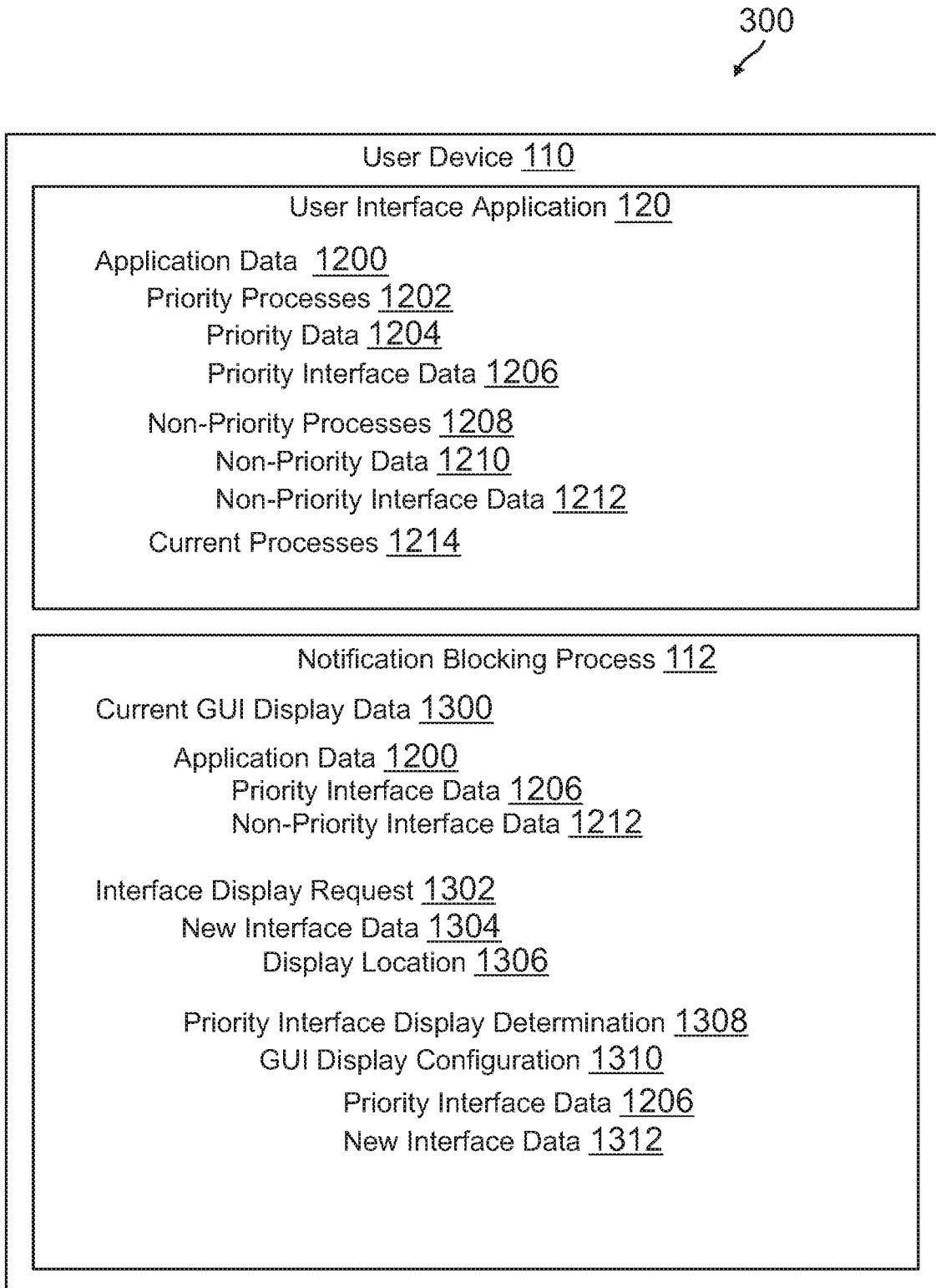
FIG. 3 is a block diagram of an exemplary computer system that blocks output of interface data during critical application processes and data output, according to an embodiment.

FIG. 3 is a block diagram of an exemplary computer system that blocks output of interface data during critical application processes and data output, according to an embodiment. Environment 300 of FIG. 3 includes user device 110 as discussed in reference to system 100 of FIG. 1. In this regard, user device 110 executes user interface application 120 and notification blocking process 112 having the processes and features discussed in reference to system 100 of FIG. 1.

For example, notification blocking process 112 may process data display prioritization information and determine, based on the information, whether to display new data on GUI that may cover or obscure other data displayed in an interface of user interface application 120. In this regard, user interface application 120 includes application data 1200 that may correspond to the current data being processed and output in one or more application interface on a GUI. Thus, application data 1200 may include priority and non-priority data, which may be ranked in order to determine how critical it is to display portions of application data 1200. For example, priority processes for user interface application 120 may include priority data that is displayed through priority interface data 1206. In contrast to priority interface data 1206 that is required or highly prioritized to be displayed by user interface application 120, non-priority processes of application data 1200 may include non-priority data 1210 displayed through non-priority interface data 1212. Priority interface data 1206 and non-priority interface data 1212 may be displayed as a result of current processes 1214 generating application data 1200.

Notification blocking process 112 may therefore determine current GUI display data 1300, which is used to block or present new data display requests based on application data 1200. For example, notification blocking process 112 may determine priority interface data 1206 and non-priority interface data 1212 being displayed in current GUI display data 1300. Notification blocking process 112 may detect an interface display request 1302 that may display new interface data 1304 in at least a portion of user device 110's GUI, for example, at a display location 1306. Notification blocking process 112 may perform a priority interface display determination 1308 based on prioritization ranks, levels, or scores for current GUI display data 1300 (e.g., for priority interface data 1206 and non-priority interface data 1212) and new interface data 1304 at display location 1306. Based on whether display location 1306 for new interface data 1304 blocks or allows display of new interface data 1304, notification blocking process 112 may determine a GUI display configuration 1310 for at least priority interface data 1206 and new interface data 1312.

Figure 4:
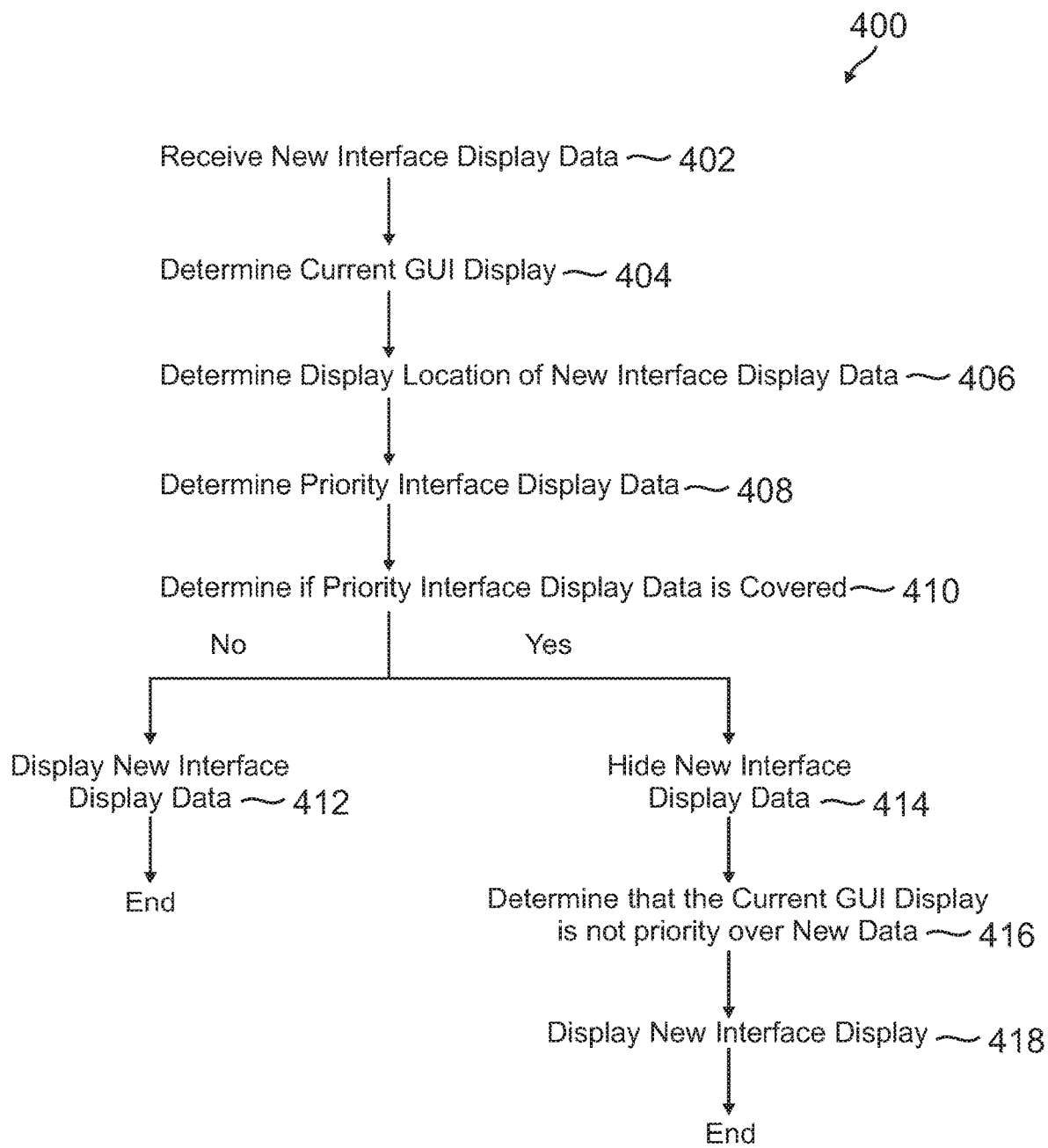
FIG. 4 is an exemplary process flowchart for interface data display optimization during critical device operations, according to an embodiment.

FIG. 4 is an exemplary process flowchart for interface data display optimization during critical device operations, according to an embodiment. Note that one or more steps, processes, and methods described herein with reference to flowchart 400 in FIG. 4 may be omitted, performed in a different sequence, or combined as desired or appropriate.

At step 402 of flowchart 400, new interface display data may be received for a device, for example, through an application process, received data, and/or user input or navigation. The new interface display data may include data content and data metadata, such as an application or entity that originated the data. In this regard, the new interface display data may be parsed or processed in order to determine a priority for display for the data, which may occur prior to or concurrently with step 404 of flowchart 400, where a current GUI display is determined. The current GUI display may correspond to application data, interfaces, and/or other output that is displayed by a GUI of the device when the new interface display data is requesting to be output on the GUI. The current GUI display data may also be parsed or processed to determine the priority for each element and data displayed with the GUI, which may correspond to the to the GUI as a whole (e.g., an entire interface), and/or sub-elements, fields, or portions of the GUI individually.

At step 406 of flowchart 400, the location of display of the new interface display data is determined. The location may be determined so that the device may determine which currently displayed data in the GUI may be partially or entirely obscured by display of the new interface display data. Thus, at step 408 of flowchart 400, priority interface display data may be determined based on the priority levels or ranks for the data in the current GUI display and the location of display of the data. Thus, the device may determine, at step 408, what data is critical for display on the GUI.

The device may further determine if the priority interface display data currently displayed on the GUI is covered or otherwise partially/completed obscured by the new interface display data, at step 410 of flowchart 400. The new interface display data may be populated in at least a portion of the GUI, and therefore, the device may determine whether this portion of the GUI contains priority data that has a higher priority for display than the new interface display data. If not, flowchart 400 may proceed to step 412, where the new interface display data is displayed on the GUI, and flowchart 400 ends. However, if the new interface display data is at least partially covered, flowchart 400 may proceed to hide the new interface display data, at step 414 of flowchart 400. The device may hide the data by preventing the data from being displayed in the portion of the GUI that the new interface display data would populate in. The device may further store the new interface data so that the new interface display data may later be displayed when the currently displayed GUI data is no longer critical. For example, at step 416 of flowchart 400, it may be determined that the current GUI display data is not a priority over the new interface display data. This may occur if the current GUI display data no longer has a priority value or score over the new interface display data. Thus, at step 418 of flowchart 400, the new interface display data may be displayed in response to determining that the current GUI display data is no longer a priority. After display of the new interface display data at step 418, flowchart 400 may end.

Figure 5:
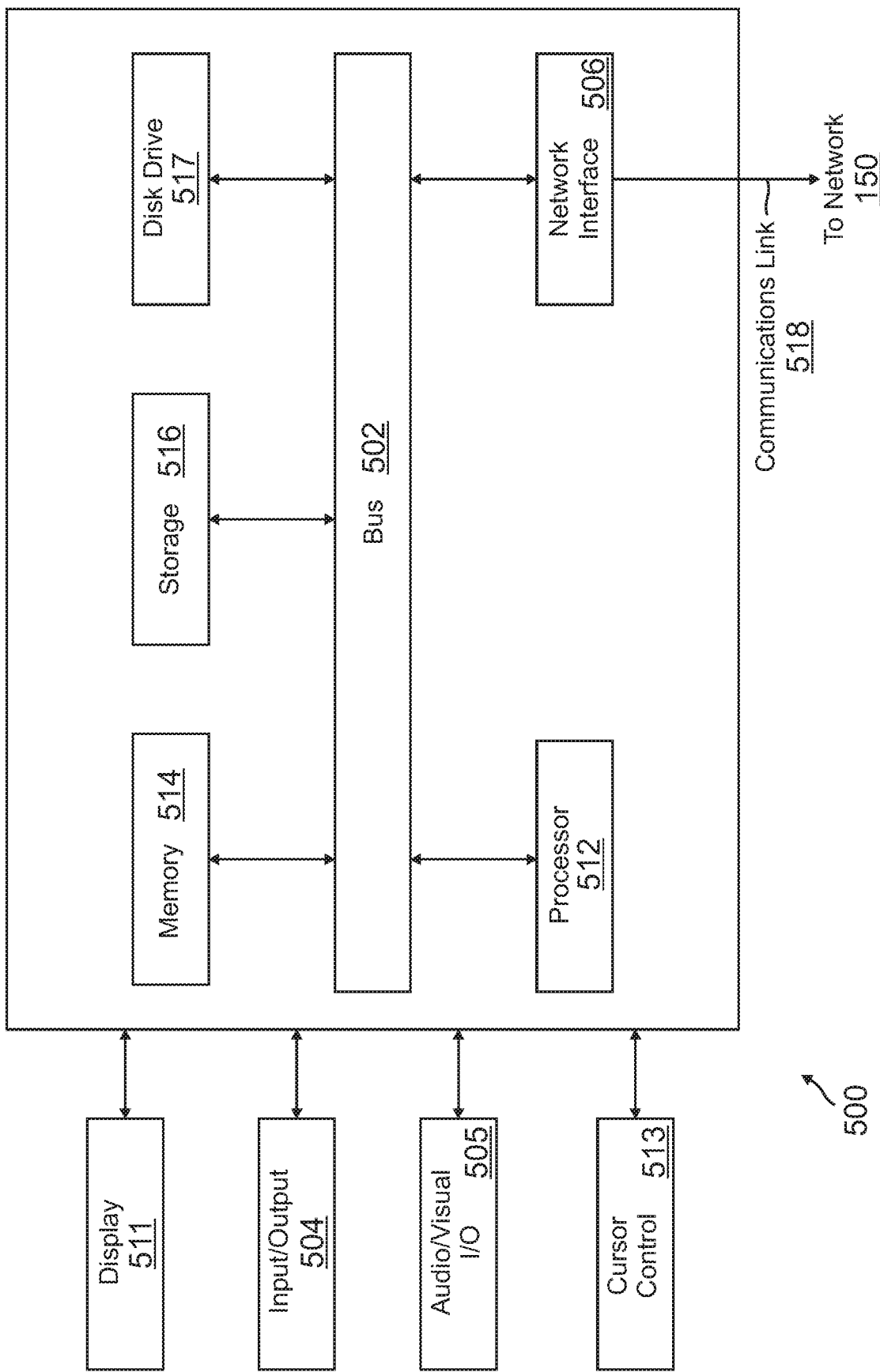
FIG. 5 is a block diagram of a computer system suitable for implementing one or more components in FIG. 1, according to an embodiment.

FIG. 5 is a block diagram of a computer system suitable for implementing one or more components in FIG. 1, according to an embodiment. In various embodiments, the communication device may comprise a personal computing device (e.g., smart phone, a computing tablet, a personal computer, laptop, a wearable computing device such as glasses or a watch, Bluetooth device, key FOB, badge, etc.) capable of communicating with the network. The service provider may utilize a network computing device (e.g., a network server) capable of communicating with the network. It should be appreciated that each of the devices utilized by users and service providers may be implemented as computer system 500 in a manner as follows.

Computer system 500 includes a bus 502 or other communication mechanism for communicating information data, signals, and information between various components of computer system 500. Components include an input/output (I/O) component 504 that processes a user action, such as selecting keys from a keypad/keyboard, selecting one or more buttons, image, or links, and/or moving one or more images, etc., and sends a corresponding signal to bus 502. I/O component 504 may also include an output component, such as a display 511 and a cursor control 513 (such as a keyboard, keypad, mouse, etc.). An optional audio input/output component 505 may also be included to allow a user to use voice for inputting information by converting audio signals. Audio I/O component 505 may allow the user to hear audio. A transceiver or network interface 506 transmits and receives signals between computer system 500 and other devices, such as another communication device, service device, or a service provider server via network 150. In one embodiment, the transmission is wireless, although other transmission mediums and methods may also be suitable. One or more processors 512, which can be a micro-controller, digital signal processor (DSP), or other processing component, processes these various signals, such as for display on computer system 500 or transmission to other devices via a communication link 518. Processor(s) 512 may also control transmission of information, such as cookies or IP addresses, to other devices.

Components of computer system 500 also include a system memory component 514 (e.g., RAM), a static storage component 516 (e.g., ROM), and/or a disk drive 517. Computer system 500 performs specific operations by processor(s) 512 and other components by executing one or more sequences of instructions contained in system memory component 514. Logic may be encoded in a computer readable medium, which may refer to any medium that participates in providing instructions to processor(s) 512 for execution. Such a medium may take many forms, including but not limited to, non-volatile media, volatile media, and transmission media. In various embodiments, non-volatile media includes optical or magnetic disks, volatile media includes dynamic memory, such as system memory component 514, and transmission media includes coaxial cables, copper wire, and fiber optics, including wires that comprise bus 502. In one embodiment, the logic is encoded in non-transitory computer readable medium. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences to practice the present disclosure may be performed by computer system 500. In various other embodiments of the present disclosure, a plurality of computer systems 500 coupled by communication link 518 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A mobile device system comprising:
   a non-transitory memory storing instructions; and
   one or more hardware processors coupled to the non-transitory memory and configured to read the instructions from the non-transitory memory to cause the mobile device system to perform operations comprising:
   displaying an application interface of a first application through a graphical user interface (GUI) of the mobile device system, wherein the application interface includes an interface element displaying first data, wherein the first application comprises a mapping application that displays a route with an upcoming transition on the route, and wherein the first data includes information about the upcoming transition on the route;
   receiving an indication of second data associated with a second application for display through the GUI;
   determining that a display of the second data overlaps at least a portion of the first data on the GUI;
   determining that a display of the first data has a higher priority than the display of the second data based on the upcoming transition;
   preventing the second data from being displayed on the GUI while the first data is being displayed until a completion of the upcoming transition on the route;
   determining that the upcoming transition is completed;
   determining that the route does not have an additional transition in the first application for an amount of travel; and
   displaying, upon determining that the first data is no longer being displayed, the second data on the GUI.

2. The mobile device system of claim 1, wherein the second data is displayed on the GUI further based upon determing one of a completion of a process in the first application, an expiration of a time limit set for the completion of the process, or a request by a user to display the second data on the GUI.

3. The mobile device system of claim 1, wherein the indication comprises a notification received through the second application executing on the mobile device system that provides the second data through a pop-up banner alert on the GUI, and wherein the operations further comprise:
   determining that the first data is necessary for a completion of an in-use process of the first application,
   wherein the determining that the display of the first data has the higher priority is based on the first data being necessary for the completion of the in-use process.

4. The mobile device system of claim 1, wherein the second data comprises one of data for a checkout process in a shopping application or data for a messaging process in a messaging application.

5. The mobile device system of claim 1, wherein determining that the display of the first data has the higher priority than the display of the second data is based on at least on one of a contact address for a notification associated with the indication, a content of the notification, or the second application that processes the notification.

6. The mobile device system of claim 1, wherein the second data comprises one of a message, a group text messaging alert, an application banner, or a social networking alert.

7. The mobile device system of claim 1, wherein the operations further comprise:
  detecting a movement of at least one of the mobile device system, a user associated with the mobile device system, or a vehicle associated with the mobile device system,
  wherein the determining that the display of the first data has the higher priority is based on the movement.

8. The mobile device system of claim 1, wherein the operations further comprise:
  determining that the first data requires input by a user in the application interface,
  wherein the determining that the display of the first data has the higher priority is based on the processing step requiring input by the user.

9. The mobile device system of claim 1, wherein the operations further comprise:
  determining a condition requiring display of the first data on the GUI, wherein the condition alerts an operating system of the mobile device system to block the second data,
  wherein the determining that the display of the first data has the higher priority is based on the condition.

10. The mobile device system of claim 9, wherein the condition comprises one of a website-specific permission set for a website, a user setting to display or block additional interfaces during an application task in the first application, a time-specific permission to display or block the additional interfaces during a time period, a location-specific permission for a location of the mobile device system, or content of the first data.

11. The mobile device system of claim 1, wherein the preventing the second data from being displayed on the GUI comprises preventing the first application from allowing scrolling through the application interface to the second data that causes the application interface to hide the first data.

12. The mobile device system of claim 1, wherein prior to the preventing, the operations further comprise:
  determining that the mobile device system is at a point along the route that indicates that the upcoming transition may occur within a time period,
  wherein the preventing is based on the determining that the mobile device system is at the point.

13. A method comprising:
  detecting a use of a first application on a computing device, wherein the first application comprises a mapping application that displays a route with an upcoming transition on the route;
  determining that the first application is performing a process during the use of the first application, the process causing a display of first interface data corresponding to the process, wherein the first interface data includes information about the upcoming transition on the route;
  blocking a display on a graphical user interface (GUI) of the computing device of second interface data associated with a second application during a performance of the process, wherein the second interface data has a lower priority for display on the GUI than the first interface data based at least on the upcoming transition, and wherein the second interface data is blocked from the display until a completion of the upcoming transition on the route;
  determining that the upcoming transition is completed;
  determining that the route does not have an additional transition in the first application for an amount of travel;
  detecting a cessation of the display of the first interface data as a result of a completion of the process based on the determining that the route does not have the additional transition for the amount of travel; and
  releasing the GUI from the blocking the display of the second interface data.

14. The method of claim 13, wherein the second interface data comprises one of data for a shopping process in the second application or data for a messaging process in the second application.

15. The method of claim 13, further comprising:
  determining that the display of the second interface data covers at least a portion of the first interface data associated with the process,
  wherein the second interface data is blocked in response to the determining that the display of the second interface data covers the at least the portion of the first interface data.

16. The method of claim 13, further comprising:
  determining that the process in the first application comprises a preferred process for the display on the GUI over incoming data including the second interface data,
  wherein the second interface data is blocked in response to the determining that the process comprises the preferred process for the display on the GUI over the incoming data.

17. The method of claim 16, wherein the determining that the process comprises the preferred process for the display on the GUI over the incoming data uses at least one of a time of the process in the first application, a location of the computing device, message content in the second interface data, or a contact address transmitting the second interface data.

18. A non-transitory machine-readable medium having stored thereon machine-readable instructions executable to cause a machine to perform operations comprising:
  determining that a mapping application on a device is displaying a route with an upcoming transition on the route on a graphical user interface (GUI) of the device, wherein the mapping application is further displaying information about the upcoming transition on the route;
  determining that an application on the device is in a transaction checkout process displayed within a checkout interface on the GUI of the device during the transaction checkout process;
  blocking data from overlapping a display of the mapping application during the upcoming transition based at least on the upcoming transition;
  determining that the upcoming transition is completed;

determining that the route does not have an additional transition in the mapping application for an amount of travel;

displaying the data for the transaction checkout process on the GUI;

determining that the transaction checkout process is completed in the application; and populating a blocked notification during the transaction checkout process on the GUI of the device.

19. The non-transitory machine-readable medium of claim 18, wherein the operations further comprise:

determining that the data that would overlap the display is designated for blocking during based on an application setting for the application, wherein the data is blocked from overlapping the display based on the determining that the data is designated for blocking based on the application setting.

20. The non-transitory machine-readable medium of claim 18, wherein the application comprises a permission for blocking the data during a use of the mapping application, and wherein the permission is provided by a user associated with the device.

\* \* \* \* \*